June 5, 1945.  E. W. DAVIS  2,377,677
LUBRICANT COMPRESSOR
Filed May 24, 1943  2 Sheets-Sheet 1
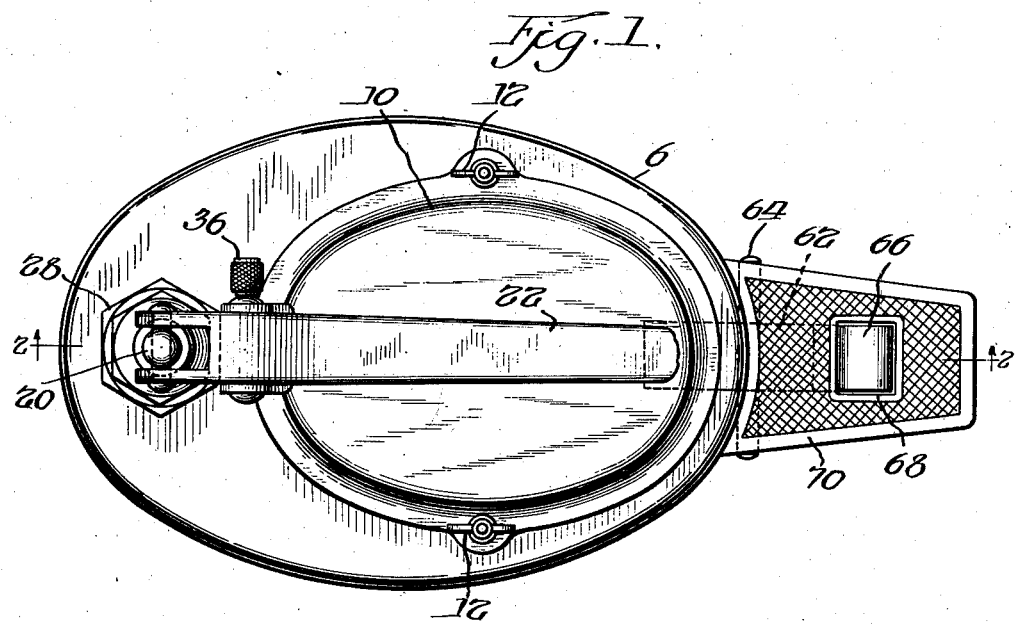
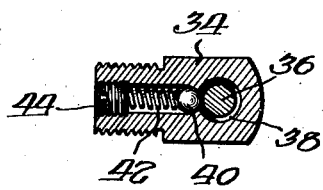
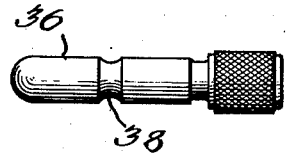
Inventor:
Ernest W. Davis

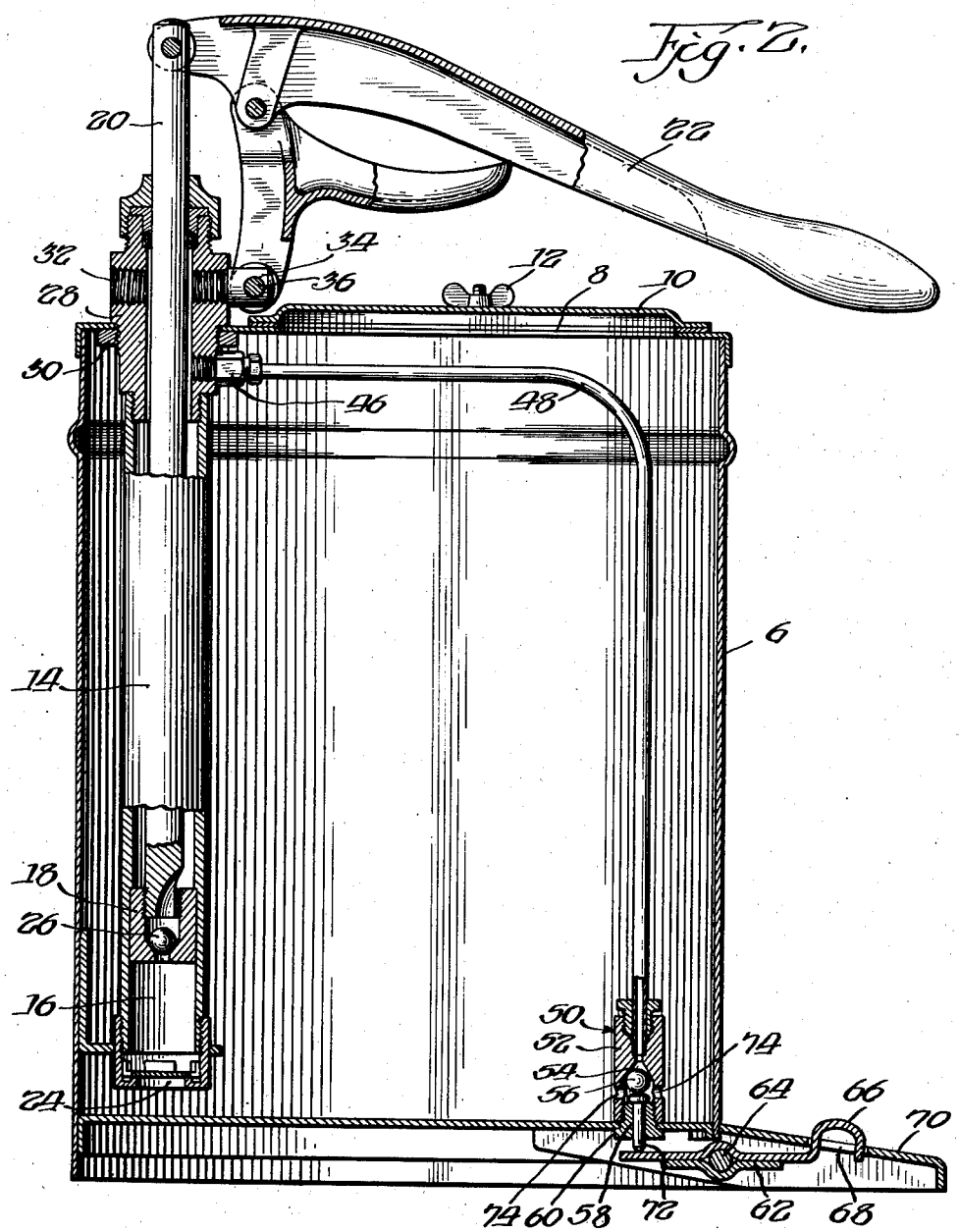

Patented June 5, 1945

2,377,677

UNITED STATES PATENT OFFICE 2,377,677

LUBRICANT COMPRESSOR

Ernest W. Davis, River Forest, Ill., assignor to Stewart-Warner Corporation, Chicago, Ill., a corporation of Virginia Application May 24, 1943, Serial No. 488,204

4 Claims. (Cl. 222—318)

My invention relates to lubricant compressors, and more particularly to hand operated lubricant compressors wherein it is desirable to release the pressure in the discharge conduit after each lubricating operation. A compressor of this type is disclosed in my United States Patent No. 2,172,136, of which the present invention is an improved construction.

A compressor of this type is ordinarily provided with a flexible, high pressure, lubricant hose, one end of which is connected to the discharge outlet of the compressor. The other end of the hose is ordinarily provided with a detachable coupling adapted for successive connection with numerous lubricant fittings attached to bearings requiring lubrication. The lubrication of some bearings requires considerable pressure, so that the residual pressure remaining in the hose after the coupling is removed from a fitting, may tend to cause objectionable oozing and dripping of lubricant from the coupling during the operation of transferring the coupling from one fitting to another.

The primary object of the present invention is to provide efficient means for releasing this residual pressure before each removal of the coupling from a fitting to which it is attached, and thereby prevent the objectionable oozing and dripping previously described.

A more specific object is to provide such a pressure release in which the operation of releasing the pressure will not be overlooked by the operator of the compressor.

Another object is to provide a lubricant compressor of the class described which is sturdy in construction, and which avoids the use of any intricate or delicate mechanism in its design.

Another object is to provide such a lubricant compressor which avoids the use of forgings in its construction, and which can be manufactured at low cost by means of high-production manufacturing methods.

A further object is to provide a lubricant compressor of the class described which avoids the use of trickey assembling operations and critical adjustments. These and other objects will appear as the description proceeds.

In the drawings:

Figure 1 is a plan view of the improved lubricant compressor;

Figure 2 is a partial sectional elevation of the same, the section being made on the line 2, 2, in Figure 1;

Figure 3 is an enlarged longitudinal section of the pivot stud shown in Figure 2; and Figure 4 is an enlarged elevation of the pivot pin shown in Figure 1 and Figure 2.

The lubricant reservoir 6 is constructed of sheet metal and has an opening 8 in the top, through which the reservoir 6 may be replenished with lubricant. The cover 10 is held in place by the wing nuts 12, 12. The tubular member 14 is bored out at the lower end to provide a cylinder 16 in which the piston 18 may be moved with vertical reciprocating motion by means of the piston rod 20 and hand lever 22. The foot valve 24 prevents reverse flow of lubricant from the cylinder 16 to the reservoir 6, and the check valve 26 prevents lubricant bypassing the piston 18 during its upward movement in the cylinder 16.

The head 28 is secured to the top of the reservoir 6 by means of the nut 30, and is threaded at its lower end for attachment of the tubular member 14. The head 28 is provided with a tapped discharge outlet 32 for connecting an ordinary grease hose (not shown) having a coupling at its free end for making successive, lubricant tight connections with a plurality of lubricant fittings attached to mechanism requiring lubrication.

The head 28 is also tapped to receive the pivot stud 34, shown more clearly in Figure 3. The pivot stud 34 is screwed very forcibly into the head 28 and, if preferred, may be brazed in that position, after which it is cross drilled to receive the pivot pin 36, shown more clearly in Figure 4. The pivot pin 36 is provided with a groove 38, for registering with the steel ball 40 (Figure 3) which is urged towards the groove 38 by the spring 42, which is retained by the plug 44.

The head 28 is also tapped to receive the tube coupling 46, for making connection with the metal tube 48, which is connected with the release valve 50. The release valve 50 includes a body member 52, having a valve seat 54 forming a lubricant tight seal with the ball closure 56. The bushing 58 is screwed into the body member 52, and is provided with a flange portion 60, which compresses the bottom of the reservoir 6 against the body portion 52.

The foot lever 62 is pivoted on the shaft 64, and is provided with an upwardly extending foot-engaging portion 66 which protrudes upwardly through an opening 68 in the stabilizing pedal 70. When the operator operates the hand lever 22 he finds it necessary to apply his foot to the stabilizing pedal 70. This causes downward movement of the foot-engaging portion 66, thereby causing tilting movement of the foot lever 62, which engages the thrust pin 72, and thereby causes the ball closure 56 to move upwardly against the valve seat 54.

When the operator has finished lubricating a bearing he removes his foot from the stabilizing pedal 70 before removing the coupling from the fitting. This allows the ball closure 56 to move away from the valve seat 54, due to the action of the lubricant pressure in the release valve 50, so that the lubricant may flow past the ball closure 56, and out through the vent openings 74, 74, and into the reservoir 6.

In replenishing the reservoir 6 with lubricant, the pivot pin 36 is withdrawn from the pivot stud 34; the hand lever 22 is swung in a counterclockwise direction as far as it will go; the wing nuts 12, and cover 10 are removed; and the reservoir 6 is then filled with lubricant through the opening 8.

Without further elaboration the foregoing will so fully explain my invention that others may, by applying knowledge current at the time of application, readily adapt the same for use under various conditions of service.

I claim:

1. In a lubricant compressor, the combination of a lubricant pumping mechanism; a discharge outlet for said pumping mechanism; a handle movable in a substantially vertical plane for operating said pumping mechanism; a lubricant reservoir for supplying lubricant to said pumping mechanism; a stabilizing pedal connected with said reservoir and positioned at the base thereof in substantial vertical alignment with said handle, whereby the application of pressure from an operator's foot applied to said stabilizing pedal while said handle is being operated, will enhance the stability of said lubricant compressor; a lubricant passageway connecting said pumping mechanism with said discharge outlet; a release valve for releasing pressure in said passageway; a movable member supported by said pedal; a foot engaging portion carried by said movable member, and positioned to engage an operator's foot applied to said pedal, whereby said movable member may be moved; and means actuated by said movement of said movable member for closing said release valve, whereby movement of said handle will produce lubricant pressure in said passageway when said operator's foot is applied to said stabilizing pedal.

2. In a lubricant compressor, the combination of a lubricant pumping mechanism; a discharge outlet for said pumping mechanism; a handle movable in a substantially vertical plane for operating said pumping mechanism; a lubricant reservoir for supplying lubricant to said pumping mechanism; a stabilizing pedal connected with said reservoir and positioned at the base thereof in substantial vertical alignment with said handle, whereby the application of pressure from an operator's foot applied to said stabilizing pedal while said handle is being operated, will enhance the stability of said lubricant compressor; a lubricant passageway connecting said pumping mechanism with said discharge outlet; a release valve for releasing pressure in said passageway; a lever pivotally supported by said stabilizing pedal, said lever being provided with a foot-engaging portion extending above said stabilizing pedal; and means actuated by movement of said lever for closing said release valve, whereby the operation of said pump will then produce pressure in said lubricant passageway.

3. In a lubricant compressor, the combination of a lubricant pumping mechanism; a discharge outlet for said pumping mechanism; a handle movable in a substantially vertical plane for operating said pumping mechanism; a lubricant reservoir for supplying lubricant to said pumping mechanism; a lubricant passageway connecting said pumping mechanism with said discharge outlet; a release valve for releasing pressure in said passageway; a stabilizing pedal connected with said reservoir and positioned at the base thereof in substantial vertical alignment with said handle, said stabilizing pedal having an opening therein; a foot-engaging portion extending upwardly through said opening; and means operated by downward movement of said foot-engaging portion for closing said release valve.

4. In a lubricant compressor, the combination of a lubricant pumping mechanism; a discharge outlet for said pumping mechanism; a handle movable in a substantially vertical plane for operating said pumping mechanism; a lubricant reservoir for supplying lubricant to said pumping mechanism; a lubricant passageway connecting said pumping mechanism with said discharge outlet; a release valve for releasing pressure in said passageway; a stabilizing pedal connected with said reservoir and positioned in substantial vertical alignment with said handle, said stabilizing pedal being located near the base of said reservoir for convenient application of an operator's foot on said stabilizing pedal; a movable member positioned for the convenient application of an operator's foot thereon simultaneously with the application of said operator's foot on said stabilizing pedal; and means actuated by movement of said movable member for closing said release valve.

ERNEST W. DAVIS.